United States Patent [19]
Chang et al.

[11] Patent Number: 5,604,650
[45] Date of Patent: Feb. 18, 1997

[54] ROTARY HEAD DRUM HAVING HEAD-AFFIXING, TRANSFORMER-AFFIXING, AND BEARING-ENGAGING SURFACES LYING IN THE SAME PLANE

[75] Inventors: Tong M. Chang, Seoul; Kyung S. Suh, Kyungki-do, both of Rep. of Korea

[73] Assignee: Goldstar Co., Ltd., Rep. of Korea

[21] Appl. No.: 626,438

[22] Filed: Apr. 2, 1996

Related U.S. Application Data

[63] Continuation of Ser. No. 319,305, Oct. 6, 1994, abandoned.

[30] Foreign Application Priority Data

Oct. 6, 1993 [KR] Rep. of Korea ................. 20656/1993

[51] Int. Cl.⁶ ........................................... G11B 5/53
[52] U.S. Cl. ............................................. 360/107; 360/84
[58] Field of Search ............................. 360/107, 84, 108, 360/130.24, 130.23, 130.22

[56] References Cited

U.S. PATENT DOCUMENTS

| | | | |
|---|---|---|---|
| 4,603,359 | 7/1986 | Narasawa et al. | 360/130.24 |
| 4,742,414 | 5/1988 | Sakai et al. | 360/130.24 |
| 4,964,006 | 10/1990 | Ota | 360/108 |
| 5,060,104 | 10/1991 | Kitaori et al. | 360/130.24 |
| 5,270,890 | 12/1993 | Katou et al. | 360/130.24 |

FOREIGN PATENT DOCUMENTS

| | | | |
|---|---|---|---|
| 63-086103 | 4/1988 | Japan | 360/130.24 |
| 2-206006 | 8/1990 | Japan | 360/130.24 |
| 2-281408 | 11/1990 | Japan | 360/130.24 |
| 4-147413 | 5/1992 | Japan | 360/130.24 |
| 4-241217 | 8/1992 | Japan | 360/130.24 |
| 2149955 | 6/1985 | United Kingdom | 360/130.22 |

*Primary Examiner*—Stuart S. Levy
*Assistant Examiner*—Craig A. Renner
*Attorney, Agent, or Firm*—Ostrolenk, Faber, Gerb & Soffen, LLP

[57] ABSTRACT

A head drum apparatus includes a head-affixing surface, a rotor transformer-affixing surface and a bearing-engaging surface which are all at the same height. This enhances the manufacturing accuracy of the head drum apparatus and a predetermined gap between the rotor transformer and assures that the stator transformer will be secured. In addition, the height of the head assembly in the course of setting it up is also secured. The head drum includes a lower drum rigidly affixed to a supporting plate of the head drum apparatus; a rotating shaft passing through the center of the lower drum and being rotatably engaged with upper and lower bearings; an upper drum, rigidly affixed to the rotating shaft, including the head-affixing surface, the rotor transformer-affixing surface, and the bearing-engaging surface which are all the same height and provided at the bottom surface of the upper drum; and a driving section disposed at the lower portion of the rotating shaft for driving the rotating shaft.

3 Claims, 4 Drawing Sheets

ROTARY HEAD DRUM HAVING HEAD-AFFIXING, TRANSFORMER-AFFIXING, AND BEARING-ENGAGING SURFACES LYING IN THE SAME PLANE

RELATED APPLICATION

This is a continuation of Application Ser. No. 08/319,305 filed on Oct. 6, 1994, now abandoned.

BACKGROUND OF THE INVENTION

1. Field of the Invention

The present invention relates in general to a head drum apparatus of a VCR(Video Tape Cassette Recorder), and particularly to an apparatus with an improved assembly accuracy by making a head-affixing surface, a rotor transformer-affixing surface and a bearing-engaging surface be at the same height and to an apparatus with an improved engaging accuracy when a rotating shaft and an upper drum are engaged.

2. Description of the Conventional Art

Conventionally, a head drum apparatus, as shown in FIG. 1, includes a lower drum 5 rigidly affixed to a supporting plate 50. A rotating shaft 1 rotatably passing through the center portion of the lower drum 5 is engaged with upper and lower bearings 3 and 4. An upper drum 2 is rotatably engaged to the upper portion of the rotating shaft 1. A rotor 11 of a motor assembly 6 is rigidly engaged to the lower portion of the rotating shaft 1, that is, below the lower drum 5. Here, the motor assembly 6 includes a stator 13 affixed to the lower portion of the lower drum 5 and a rotor 11 rotatably affixed to the lower portion of the rotating shaft. In addition, a ring collar 12 rigidly affixed to the rotor 11 is rigidly affixed to the rotating shaft 1. The lower surface of the upper drum 2 and the upper surface of the lower drum 5 are facing each other. A plurality of head assemblies 7 between the lower surface of the upper drum 2 and the upper surface of the lower drum 5 are rigidly affixed to a predetermined portion of the lower surface of the upper drum 2. A rotor transformer 9 disposed at the inside portion of the head assembly 7 is rigidly affixed to a predetermined portion of the lower surface of the upper drum 2. A stator transformer 10 rigidly affixed to a predetermined portion of the upper surface of the lower drum 5 is kept at a predetermined gap with the rotor transformer 9. Here, reference numeral 14 denotes screws for affixing an outer housing(not shown) to the body of the rotor 11.

The operational description of the conventional head drum apparatus will now be explained.

When power is applied to the motor assembly 6 of the head drum apparatus, the rotor 11 is activated to generate the rotating force with an electric and magnetic operation at the motor assembly 6. Thereafter, the rotating force generated at the motor assembly 6 is applied to the rotating shaft 1 and rotates the upper drum 2 which is rigidly affixed to the rotating shaft 1. At this time, a tape wrapped around the upper drum 2 and the lower drum 5 is scanned as the upper drum 2 rotates. The audio and video signals read by the head assembly is applied to the rotor transformer 9 via a PCB-(Printed Circuit Board) of the head assembly(not shown). The signals applied to the rotor transformer 9 is applied to the stator transformer 10 in a manner of non-contact and then is applied to the circuit section(not shown) thereof.

The detailed description of the structure of the upper drum 2 will now be explained.

As shown in FIG. 2, a stopper surface 21 and a chucking surface 22 are formed at the upper surface of the upper drum 2. A head-affixing surface 23 where the upper surface of the head assembly 7 is rigidly affixed thereto and a rotor transformer-affixing surface 24 where the upper surface of the rotor transformer 9 is rigidly affixed thereto are at the same height. At the inside portion thereof, the bearing-engaging surface 26 is formed.

In addition, as shown in FIG. 3, bearing-engaging surface 26 maintaining a predetermined gap with an upper surface of the upper bearing 3 is formed in order for having a step by the incline 28. Here, reference numeral 27 denotes an engaging surface where an outer surface of the rotating shaft 1 and the upper drum 2 is rigidly engaged.

However, the conventional head drum apparatus described above includes some problems in that the desired manufacturing accuracy cannot be obtained so that the height of the head-affixing surface 23 and the rotor transformer surface 24 is different from that of the bearing-engaging surface 26. Accordingly, an air-gap, which is one of the major points of making sure the performance of the head drum apparatus, between the rotor transformer 9 and the stator transformer 10 is difficult to be secured.

In addition, at the time of engaging the rotating shaft 1 into the upper drum 2, it is difficult to adjust the center between the engaging surface 27 of the upper drum 2 and the rotating shaft 1 as well as to engage the upper drum 2 vertically into the rotating shaft 1.

SUMMARY OF THE INVENTION

Accordingly, it is an object of the present invention to provide a head drum apparatus capable of enhancing an assembly accuracy thereof.

It is a further object of the present invention to provide an apparatus capable of enhancing an engaging accuracy of a rotating shaft.

To achieve the object the head drum apparatus according to the present invention includes a lower drum rigidly affixed to a supporting plate of the head drum apparatus; a rotating shaft passing through the center of the lower drum and being rotatably engaged with upper and lower bearings; an upper drum, rigidly affixed to the rotating shaft, including a head-affixing surface, a rotor transformer-affixing surface, and a bearing-engaging surface which are all at the same height and provided at the bottom surface of the upper dram; and a driving section disposed at the lower portion of the rotating shaft for driving the rotating shaft.

BRIEF DESCRIPTION OF THE DRAWINGS

The objects and features of the invention may be more readily understood with reference to the following detailed description of an illustrative embodiment of the invention, taken together with the accompanying drawings in which.

DESCRIPTION OF THE PREFERRED EMBODIMENTS

Although the preferred embodiments of the present invention have been disclosed for illustrative purpose, those skilled in the art will appreciate that various modification, additions and substitution are possible, without departing from the scope and spirit of the invention as recited in the accompanying claims.

Figure 1:
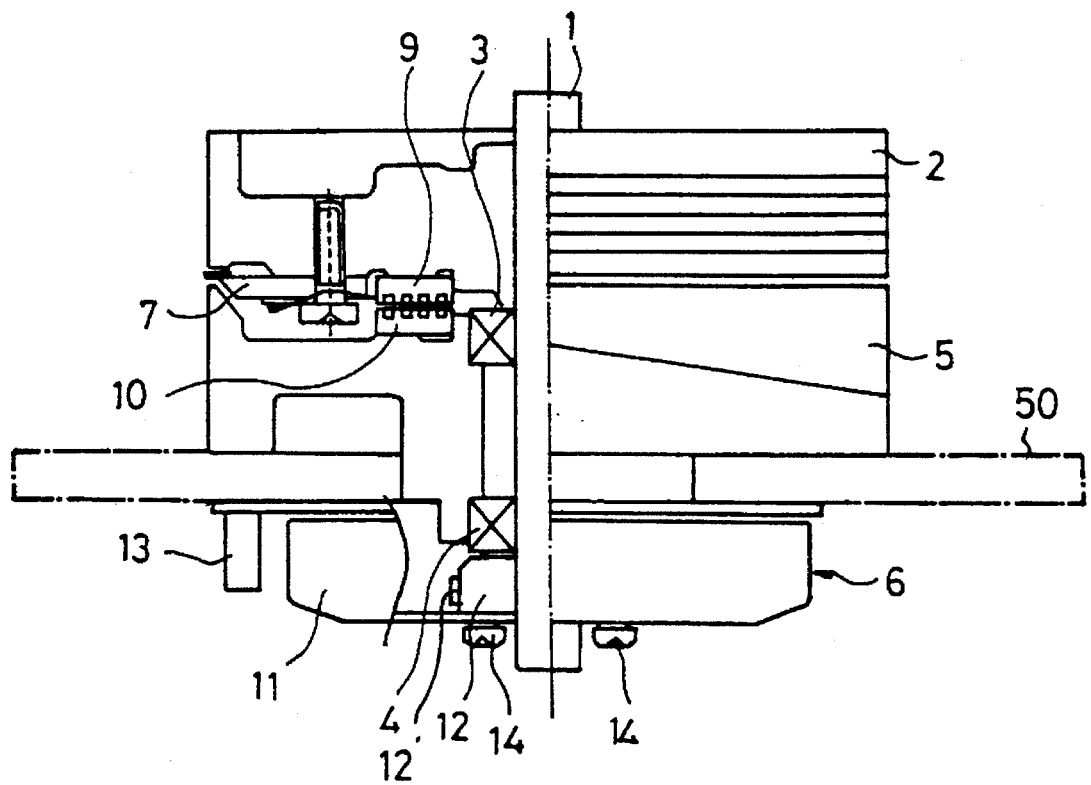
FIG. 1 is a cross-sectional view showing a structure of a conventional head drum apparatus.
Figure 2:
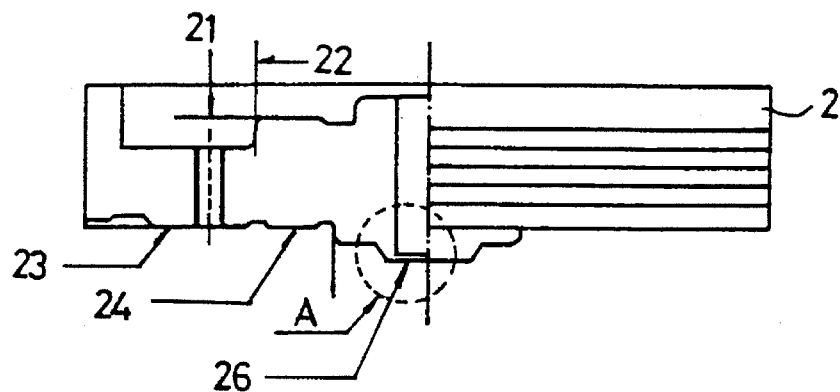
FIG. 2 is a cross-sectional view showing an upper drum of a conventional head drum apparatus.
Figure 3:
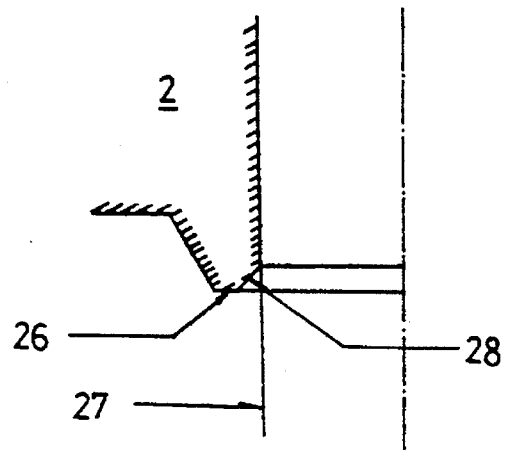
FIG. 3 is an enlarged view of A-section of FIG. 2.
Figure 4:
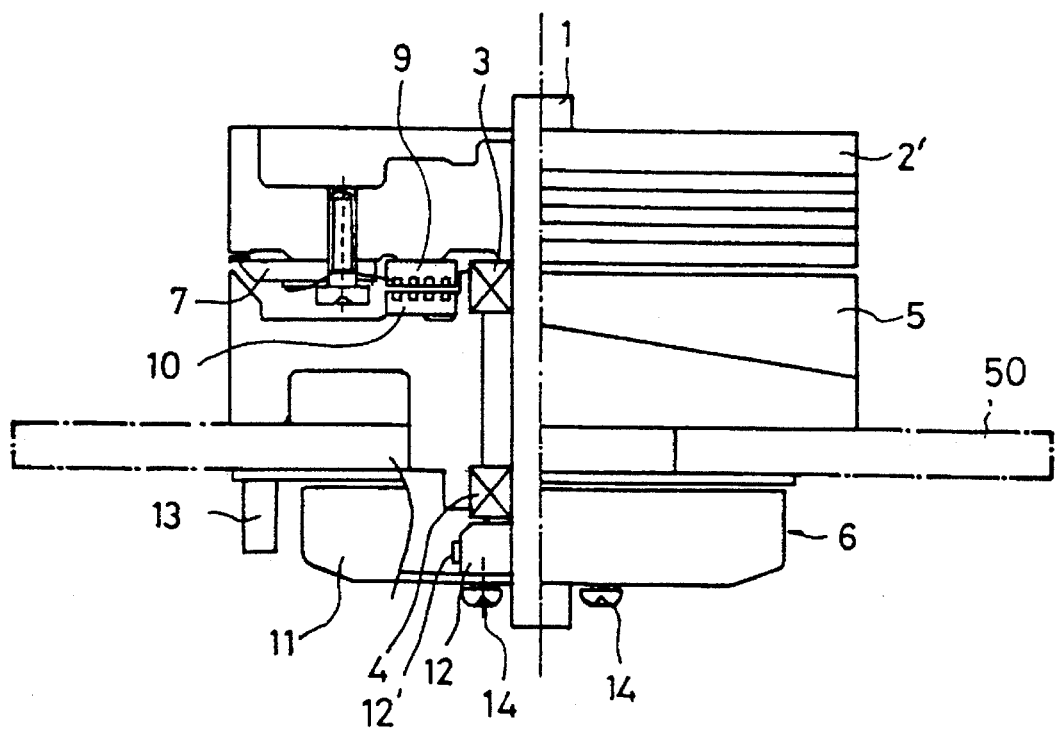
FIG. 4 is a cross-sectional view showing a structure of a head drum apparatus according to the present invention.
Figure 5:
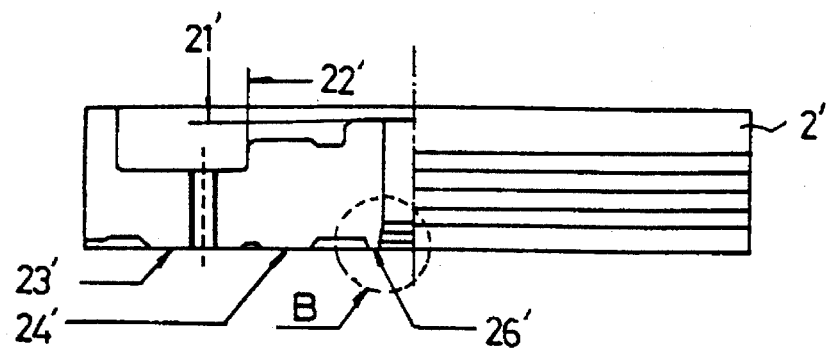
FIG. 5 is a cross-sectional view showing an upper drum of a head drum apparatus according to the present invention.
Figure 6:
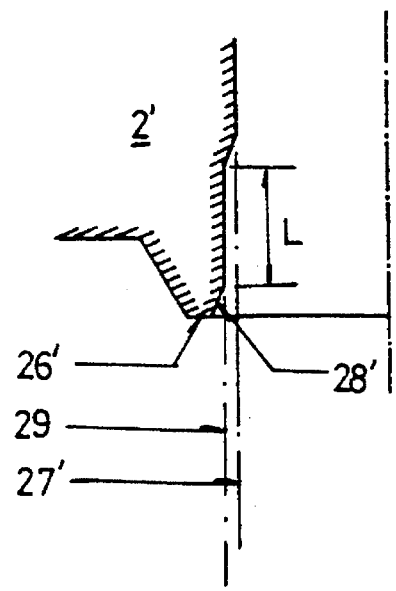
FIG. 6 is an enlarged view of B-section of FIG. 5.

FIG. 4 shows a head drum apparatus according to the present invention, FIG. 5 shows an upper drum of the head drum apparatus according to the present invention and FIG. 6 shows an enlarged view of the B-section of FIG. 5.

As shown therein, the head drum apparatus according to the present invention includes a lower drum 5 rigidly affixed to a supporting plate 50. A rotating shaft 1 rotatably passing through the center portion of the lower drum 5 is engaged with upper and lower bearings 3 and 4. An upper drum 2' is rigidly engaged to the upper portion of the rotating shaft 1. A rotor 11 of a motor assembly 6 is rigidly engaged to the lower portion of the rotating shaft 1, that is, below the lower drum 5. Here, the motor assembly 6 includes a stator 13 affixed to the lower portion of the lower drum 5 and a rotor 11 rotatably affixed to the lower portion of the rotating shaft. In addition, a ring collar 12 rigidly affixed to the rotor 11 is rigidly affixed to the rotating shaft 1. The lower surface of the upper drum 2' and the upper surface of the lower drum 5 are facing each other. A plurality of head assemblies 7 between the lower surface of the upper drum 2' and the upper surface of the lower drum 5 are rigidly affixed to a predetermined portion of the lower surface of the upper drum 2'. A rotor transformer 9 disposed at the inside portion of the head assemblies 7 is rigidly affixed to a predetermined portion of the lower surface of the upper drum 2'. A stator transformer 10 rigidly affixed to a predetermined portion of the upper surface of the lower drum 5 is kept at a predetermined gap with the rotor transformer 9. Here, reference numeral 14 denotes screws for affixing an outer housing(not shown) to the body of the rotor 11. A stopper surface 21' and a chucking surface 22' are formed at the upper surface of the upper drum 2'. A head-affixing surface 23' where the upper surface of the head assemblies 7 is rigidly affixed thereto, a rotor transformer-affixing surface 24' where the upper surface of the rotor transformer 9 is rigidly affixed thereto and the bearing-engaging surface 26' are provided in order that all the surfaces should be at the same height. In addition, at a predetermined portion of the rotating shaft engaging surface 27' provided between the outer surface of the rotating shaft 1 and the upper drum 2', there is a rotating shaft engagement guiding surface 29 of length L. At one end of the rotating shaft engagement guiding surface 29 having an inner diameter larger than an outer diameter of the rotating shaft 1 is formed an incline 28'. A bearing engaging surface 26' is formed at the end portion of the incline 28'.

The operational description of the head drum apparatus according to the present invention will now be explained.

When power is applied to the motor assembly 6 of the head drum apparatus, the rotor 11 is activated to generate the rotating force with an electric and magnetic operation at the motor assembly 6. Thereafter, the rotating force generated at the motor assembly 6 is applied to the rotating shaft 1 and rotates the upper drum 2' which is rigidly affixed to the rotating shaft 1. At this time, a tape wrapped around the upper drum 2' and the lower drum 5 is scanned as the upper drum 2' rotates. The audio and video signals read by the head assemblies 7 are applied to the rotor transformer 9 via a PCB(Printed Circuit Board) of the head assemblies 7 (not shown). The signals applied to the rotor transformer 9 is applied to the stator transformer 10 in a manner of non-contact and then is applied to a circuit section(not shown) thereof.

The effects of the head drum apparatus will now be explained.

By making the head-affixing surface, the rotor-affixing surface, and the bearing-engaging surface be at the same height, the manufacturing accuracy of the head drum apparatus and a predetermined gap between the rotor transformer and the stator transformer will be secured. In addition, the height of the head assembly in the course of setting up will also be secured.

By providing the rotating shaft engagement guiding surface at the engaging surface, the centering of the rotating shaft will be secured when engaging the rotating shaft into the upper drum.

Figure 7:
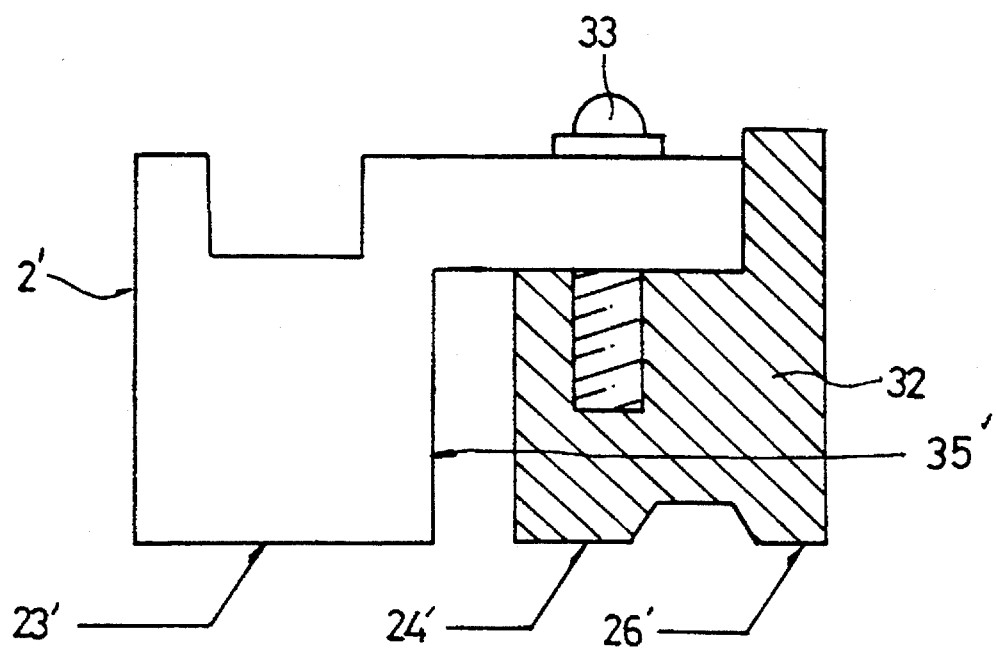
FIG. 7 is a cross-sectional view showing a head drum apparatus of another embodiment according to the present invention.

Meanwhile, a head drum apparatus of another embodiment according to the present invention as shown in FIG. 7 includes a circular groove 35' with a predetermined depth, which is formed at the center portion of the upper drum 2' for receiving a flange 32 having a rotor transformer-affixing surface 24' and beating-engaging surface 26'. A screw 33 is provided at a predetermined portion of the upper surface of the upper drum 2' for securing the flange 32 thereto. Here, the head-affixing surface, rotor transformer-affixing surface and bearing-engaging surface 26' should be provided at the same height, thereby enhancing the manufacturing accuracy of the head drum apparatus and ensuring that a predetermined gap between the rotor transformer and the stator transformer will be secured. In addition, the height of the head assembly in the course of setting up will also be secured.

What is claimed is:

1. A rotary head drum apparatus, comprising:

a stationary lower drum;

a rotating shaft passing through the center of the lower drum and being rotatably engaged with a bearing member supported by said lower drum;

an upper drum, rigidly affixed to the rotating shaft, and including a head-affixing surface to which a head is affixed, a rotary transformer-affixing surface to which a rotary transformer is affixed, and a bearing-engaging surface with which the bearing member is engaged,; and a driving device for driving the rotating shaft;

wherein said head-affixing surface, said rotary transformer-affixing surface and said bearing-engaging surface are all provided at a bottom surface of said upper drum, face said lower drum, and lie in the same plane, whereby rotary head drum assembly accuracy is enhanced.

2. The apparatus of claim 1, wherein said upper drum includes a rotating shaft engagement guiding surface having an inner diameter larger than an outer diameter of the rotating shaft and having inclines at upper and lower portions thereof.

3. The apparatus of claim 1, wherein said upper drum includes a circular groove formed at a center portion thereof with a predetermined diameter and depth for receiving a flange member having said rotary transformer-affixing surface and said bearing-engaging surface.

* * * * *